United States Patent [19]

Janssen et al.

[11] 4,391,145
[45] Jul. 5, 1983

[54] FLUID-PRESSURE RESPONSIVE APPARATUS

[75] Inventors: Sylvain Janssen, Neuilly; Jean Sequies, Rueil Malmaison, both of France

[73] Assignee: Giers, Montrouge, France

[21] Appl. No.: 248,620

[22] Filed: Mar. 27, 1981

[30] Foreign Application Priority Data

Apr. 3, 1980 [GB] United Kingdom ............... 8011351

[51] Int. Cl.³ ............................................. G01L 11/00
[52] U.S. Cl. ........................................ 73/704; 73/737
[58] Field of Search ................. 73/704, 702, 737, 735, 73/DIG. 1

[56] References Cited

U.S. PATENT DOCUMENTS

| | | | |
|---|---|---|---|
| 339,559 | 4/1886 | Kunkle | 73/737 |
| 2,823,543 | 2/1958 | Voss | 73/737 |
| 3,618,391 | 11/1971 | Rivkin et al. | 73/704 |

FOREIGN PATENT DOCUMENTS

| | | |
|---|---|---|
| 2337884 | 2/1975 | Fed. Rep. of Germany . |
| 2109175 | 10/1975 | Fed. Rep. of Germany . |
| 7822974 | 11/1978 | Fed. Rep. of Germany . |
| 1206800 | 2/1960 | France . |
| 5295 | of 1915 | United Kingdom ............... 73/737 |

*Primary Examiner*—Donald O. Woodiel
*Attorney, Agent, or Firm*—Dale Gaudier

[57] ABSTRACT

A fluid pressure gauge comprises a unitary, sealed, U-shaped hollow tube (12) with an electrically conductive ribbon (14) stretched between the ends of its arms (18). Fluid pressure applied to the interior of the tube via an inlet (24) on the axis of symmetry tends to straighten the tube, thereby varying the tension in the ribbon. The tension, and thus the pressure, are sensed by measuring the natural frequency of electromagnetically-maintained transverse vibration of the ribbon. Adjustment of the initial tension of the ribbon enables temperature sensitivity of the gauge to be reduced. One arm of the tube can be omitted, the ribbon being connected chordally across the curved portion and the pressure being applied through the remaining arm, or alternatively the tube can be serpentine in form.

12 Claims, 7 Drawing Figures

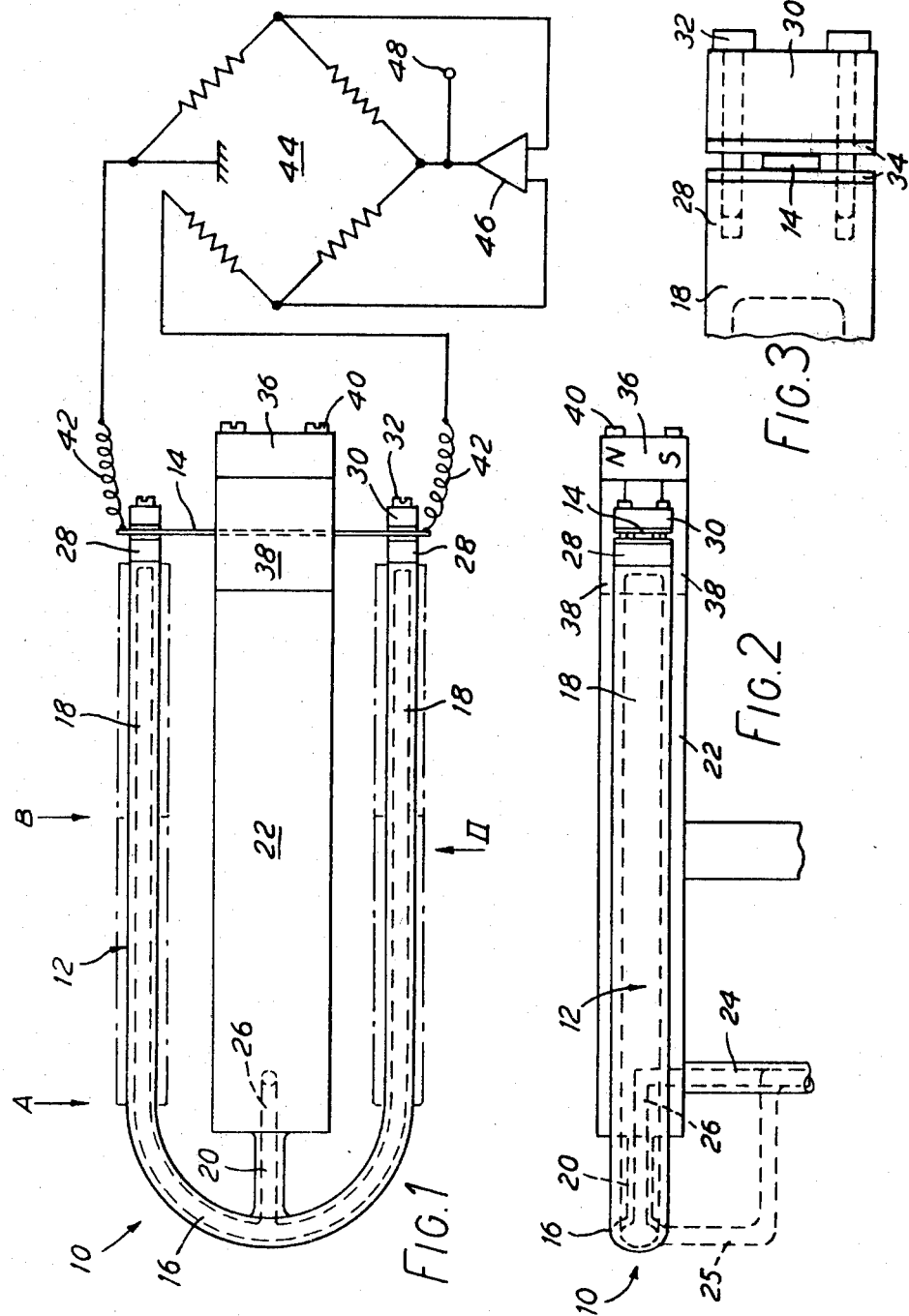

FLUID-PRESSURE RESPONSIVE APPARATUS

This invention relates to fluid-pressure responsive apparatus, and in particular to fluid-pressure responsive apparatus of the kind in which the tension in a vibratable cord-like member is caused to vary in accordance with the pressure of a fluid.

In one known type of pressure responsive apparatus, a vibratable cord-like member extends under tension between a base member and a diaphragm. Variation in pressure acting on the diaphragm results in corresponding variation of the tension in the cord-like member. The frequency of vibration of the cord-like member, induced by an electromagnet adjacent to the cord-like member, is dependent on the tension, and thus provides an indication of the pressure acting on the diaphragm.

Another form of apparatus has been described, for example in British Patent Specification No. 1,234,890, in which the cord-like member is made integrally with two curved tubular members which are in turn mounted in a block of the same material chosen for its low coefficient of thermal expansion.

According to one aspect of this invention there is provided fluid-pressure responsive apparatus comprising:

elongate means at least a portion of which is hollow and curved, and a resilient member interconnecting two points on said elongate means which are separated by said hollow, curved portion, whereby application of fluid pressure within said portion causes a change in tension in said resilient member; and means arranged to induce oscillation of said resilient member and to generate a signal related to the frequency of said oscillation; characterised in that at least the entirety of said hollow, curved portion of said elongate means is of unitary construction.

It has been found that, with such an arrangement, a low sensitivity to changes in temperature can be obtained. In particular in an arrangement in which the elongate means is semi-circular, and has two straight limbs extending from the curved portion thereof, the said points interconnected by the resilient member being located on said limbs, at the free ends thereof, it has been found that the temperature sensitivity of the apparatus can be made to vary from a positive value through zero to a negative value as the inherent tension in the resilient member for zero applied pressure is increased. Consequently, the apparatus can be arranged to have a low sensitivity to temperature by applying an appropriate tension to the resilient member when it is secured to the elongate means.

Fluid-pressure responsive apparatus in accordance with this invention will now be described, by way of example, with reference to the accompanying drawings, in which:

FIG. 1 is a schematic plan view of a first form of the apparatus;

FIG. 2 is a side view in the direction of the arrow II of the apparatus of FIG. 1;

FIG. 3 is an enlarged fragmentary view of part of the apparatus as shown in FIG. 2;

Figure 4:
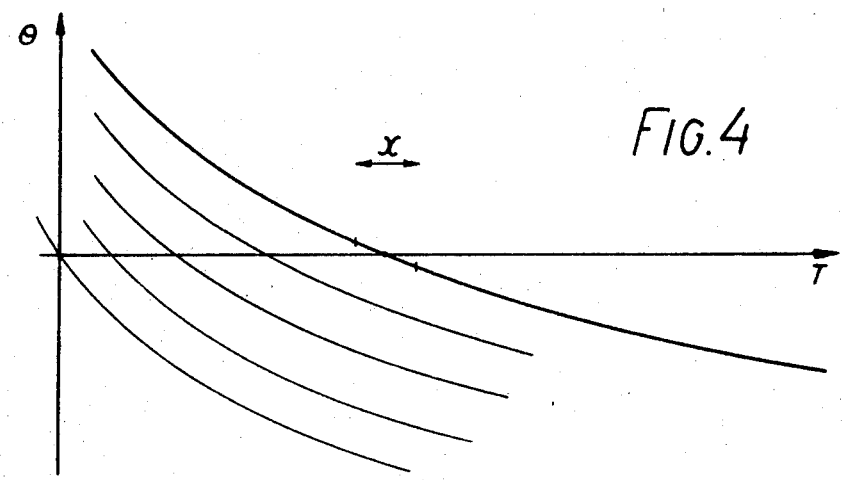
FIG. 4 is a generalised graph illustrating the sensitivity to temperature of the apparatus of FIG. 1.

Referring to FIGS. 1 and 2, a first form of the apparatus, indicated generally at 10, essentially comprises a U-shaped tube 12, the ends of which are joined by a resilient metal ribbon 14. As is best shown at the left hand side of FIG. 2, the tube 12 is oblate in cross-section, with its larger dimension transverse to the plane of the U-tube 12. The curved part 16 of the U-tube 12 is semi-circular, and the two limbs 18 of the U-tube 12 extend tangentially from the semi-circular part 16 and generally parallel to each other. A short pipe 20 extends between, and is welded to, the mid-point of the semi-circular part 16 and a metal bar 22 disposed between and parallel to the limbs 18. An inlet 24 is mounted on the bar 22 and coupled to the interior of the U-tube 12 via the pipe 20 and a passageway 26 in the bar 22, which thus provides for connection of the apparatus 10 both to its mechanical support and to the fluid whose pressure is to be measured.

As is best shown in the enlarged view of FIG. 3, an end block 28 is welded to the end of each limb 18, and a respective end of the ribbon 14 is clamped to the end block 28 by a clamp block 30 which is secured to the end block 28 by bolts 32. The ribbon 14 itself is sandwiched between two thin sheets 34 of electrically insulating material in order to isolate it electrically from the blocks 28 and 30.

A permanent magnet 36 and two pole pieces 38 are secured to the free end of the bar 22 by bolts 40 so that the pole pieces 38 straddle the ribbon 14, thereby providing a magnetic field extending parallel to the broader dimension of the ribbon 14.

The free ends of the ribbon 14 are connected by flexible leads 42 in series with one arm of a resistance bridge 44. Two diagonally-opposed corners of the bridge 44 are coupled to the inputs of a differential amplifier 46, and the remaining two corners of the bridge 44 are coupled, respectively, to the output of the amplifier 46 and to ground. The output of the differential amplifier 46 is also coupled to an output terminal 48. When the amplifier 46 is energised, it causes a current to flow through the bridge 44, and thus in part through the ribbon 14. This current in the ribbon 14 interacts with the magnetic field provided by the magnet 36 and the pole pieces 38, deflecting the ribbon 14 sideways and inducing a reverse E.M.F. in the ribbon 14. The feedback of this reverse E.M.F. to the input of the amplifier 46 ultimately results in transverse vibration of the ribbon 14, and the generation by the amplifier 46 of a corresponding oscillatory signal, at a frequency dependent in part on the tension of the ribbon 14.

When fluid pressure is applied to the interior of the U-tube 12, via the inlet 24, the passageway 26 and the pipe 20, forces tending to straighten the curved part 16 of the U-tube 12 are developed, and these forces therefore also tend to spread the limbs 18 further apart, thereby increasing the tension in the ribbon 14. Consequently, the frequency of vibration of the ribbon 14 increases, as does the frequency of the corresponding oscillatory signal produced by the amplifier 46. This signal is available at the output terminal 48, and its frequency can be monitored by conventional methods to obtain an indication of the tension in the ribbon 14 and thus of the differential pressure applied between the interior and the exterior of the U-tube 12. The actual pressure value would in general be derived from the frequency by computation involving a predetermined calibration law for the apparatus.

It has been found that in contrast to known instruments using deformable tubes (for example, Bourdon-tube type instruments) the arrangement shown in FIG. 1 can be adjusted to have a low sensitivity to temperature changes. In particular, it has been found that, as indicated schematically in FIG. 4, the sensitivity to temperature changes is dependent at least in part on the inherent tension in the ribbon 14 for zero net differential pressure applied to the U-tube 12; the apparatus can be so arranged that, as the tension T is increased, the coefficient of temperature sensitivity $\theta$, which is initially positive, decreases, passes through zero, and then becomes negative. The form of the curve remains unchanged for different combinations of the materials of the U-tube 12 and the ribbon 14, whereas the intercepts on the X and Y axes do vary, giving rise to the family of curves shown in FIG. 4. Thus, for a given combination of materials, it is generally possible to set the coefficient $\theta$, to be at or close to zero (that is, in the range $\chi$ indicated in FIG. 4) by adjusting the inherent tension in the ribbon 14 for zero applied pressure at the inlet 24 to the appropriate value when the ribbon 14 is being clamped between the blocks 28 and 30.

As can be seen in FIG. 1, the arrangement requires only a limited number of component parts each of relatively simple configuration. Furthermore, the arrangement permits a choice of materials for U-tube 12 and the ribbon 14, to suit particular requirements regarding corrosion, electrical resistance and pressure range to be measured, for example. In this latter respect, it is envisaged that the same basic arrangement can be adapted, by appropriate choice in particular of the dimensions of the U-tube 12, to provide pressure measurements having full scale values from 0.5 bar to 1,000 bars. Another advantage of the arrangement shown in FIG. 1 is that as the inlet pressure varies between 0 and full scale value, the resonant frequency of the ribbon 14 varies typically from 400 Hz up to 2 kHz, thereby facilitating the measurement of this frequency, and therefore of the corresponding inlet pressure, to a high degree of resolution.

It is thought that the advantageous properties of the arrangement shown in FIG. 1 arise in particular from the unitary nature of the curved part 16 of the U-tube 12, this part 16 being of primary importance in the production of a force corresponding to the applied inlet pressure. The absence of joints, that would be required if the curved part 16 were made from more than one piece, avoids constraints on the response of the U-tube 12 to applied pressure of a kind that could introduce highly variable and erratic perturbations in this force. It is further thought that the provision of the limbs 18 permits this force to be coupled to the ribbon 14 without perturbation, and in particular without significant distortion of the curved part 16 of the U-tube 12. Such distortion, either of the U-tube itself, or at its joint with the ribbon 14, is thought to be undesirable since it may introduce unquantifiable but substantial perturbations related to the elastic properties of the materials involved.

The location of the inlet pipe 20 on the mid-line of the apparatus is also considered to be beneficial (though not, as indicated below, essential), since it maintains the symmetry of the configuration, and thus of the forces developed on each side of the mid-line. It is thought that this effect can be enhanced by providing this inlet pipe 20 with an elbow and positioning it as shown in the dotted lines at 25 in FIG. 2, that is on the U-tube 12 at the mid-line, but projecting transversely to the plane of the U-tube 12. Such a position for the inlet, on the neutral median, would minimise its constraining effect on the freedom of the U-tube to respond to pressure applied via the inlet.

As noted earlier, the apparatus can be adjusted for a low temperature sensitivity. To reduce the effects of such sensitivity as remains, other measures can be taken. Thus, the apparatus can be placed in an enclosure filled with helium (which has a high thermal conductivity and will therefore minimise temperature gradients in the enclosure), together with an accurate temperature sensor (sensing, for example, the frequency of a vibrating quartz crystal in thermal contact with the helium). In these circumstances, the apparatus would indicate the differential pressure as between the helium and fluid supplied to the interior of the U-tube 12 via its inlet and a passageway through the enclosure wall. The temperature indication from the temperature sensor would then be incorporated in the computation to derive the pressure value, both to compensate for variations in the helium pressure with temperature, and to correct errors arising from the temperature sensitivity of the apparatus itself in accordance with a predetermined calibration relationship. The primary advantage in this case of the low temperature sensitivity obtainable with the apparatus is that it permits a more accurate pressure measurement to be obtained without an especially accurate temperature measurement.

Figure 5:
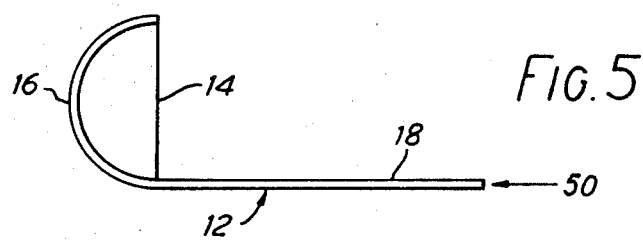
FIG. 5 illustrates diagramatically a second form of the apparatus.

It is envisaged that various modifications may be made to the arrangement shown in FIG. 1. Thus, for example, the limbs 18 need not be unitary with the curved portion 16. They may instead be formed either partially or completely of solid bars joined to the U-tube 12, in the first case at the point indicated by the arrow B and in the second case at the point indicated by the arrow A in FIG. 1. Although as indicated above the limbs 18 are thought to contribute to the desirable characteristics of the apparatus, their presence is not essential, in particular if reduced resolution is acceptable. Thus, for example, as shown in FIG. 5, one of the limbs 18 may be omitted, the ribbon 14 then being fastened directly across the ends of the semi-circular portion 16 of the tube 12. Although this configuration involves a joint directly between the ribbon 14 and the semi-circular portion 16, and the possible consequent perturbations arising from elastic effects, this configuration has the advantage of being very simple in construction and in particular of permitting the pressure inlet to be formed directly at one end of the tube 12, that is at the point 50 shown in FIG. 5.

Figure 6:
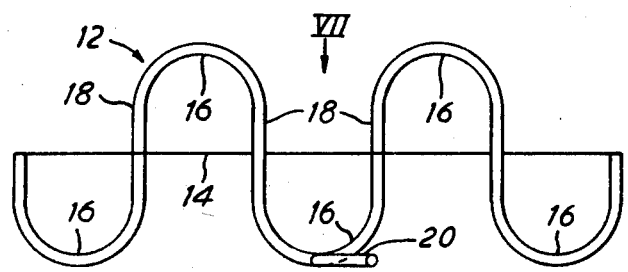
FIGS. 6 and 7 illustrate diagrammatically a third form of the apparatus.
Figure 7:
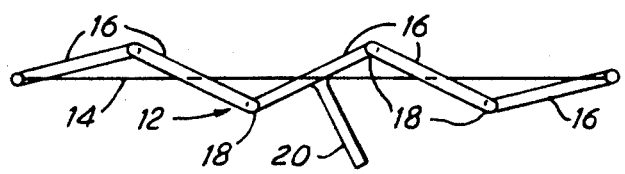

In general, it is advantageous for the force-generating part of the apparatus (the tube 12) to be less stiff than the force-responsive part (the ribbon 14). The stiffness of the tube 12 can be reduced, for example, by means of the configuration shown in FIGS. 6 and 7, in which the tube 12 is serpentine in form, with several curved parts 16. The ribbon 14 spans the full length of the tube 12, between the outer ends of the two end curved parts 16. To provide the ribbon 14 with an unobstructed path, alternate limbs 18 are displaced to opposite sides of the median plane of the apparatus, along which the ribbon 14 extends. The inlet pipe 20 is coupled to the centre one of the curved parts 16.

We claim:
1. Fluid-pressure responsive apparatus comprising: elongate means at least a portion of which is hollow and curved, and a resilient member interconnecting two points on said elongate means which are sepa- rated by said hollow, curved portion, whereby application of fluid pressure within said portion causes a change in tension in said resilient member; and means arranged to induce oscillation of said resilient member and to generate a signal related to the frequency of said oscillation; and wherein at least the entirety of said hollow, curved portion of said elongate means is of unitary construction and said elongate means is placed under a predetermined amount of tension by said resilient member, whereby temperature sensitivity of said apparatus is reduced.

2. Apparatus according to claim 1, wherein said curved portion of said elongate means is an arc of a circle.

3. Apparatus according to claim 2, wherein said curved portion of said elongate means is semi-circular.

4. Apparatus according to claim 1, wherein said elongate means has two straight limbs extending from said curved portion, and said points interconnected by said resilient member are located on said limbs.

5. Apparatus according to claim 4, wherein said points are at the free ends of said limbs.

6. Apparatus according to claim 4, wherein said limbs are integral with said curved portion.

7. Apparatus according to claim 4, wherein said limbs are solid.

8. Apparatus according to claim 1, wherein said elongate means has a pressure inlet and a support situated on said curved portion and on an axis of symmetry of the apparatus.

9. Apparatus according to claim 8, wherein said pressure inlet enters said elongate means in a direction approximately transverse to the plane of said curved portion.

10. Apparatus according to claim 1, wherein said resilient member is secured to said elongate means at a predetermined tension for zero applied pressure in said curved portion, said predetermined tension being selected substantially to minimise the sensitivity to temperature of the apparatus.

11. Apparatus according to claim 1, wherein said hollow portion of said elongate means is oblate in cross-section.

12. Apparatus according to claim 1, wherein said resilient member is secured to said elongate means at said two points.

* * * * *